US012256181B2

(12) United States Patent
Liao et al.

(10) Patent No.: US 12,256,181 B2
(45) Date of Patent: Mar. 18, 2025

(54) OPTICAL FIBER CONNECTION DETECTION METHOD AND RELATED DEVICE

(71) Applicant: Huawei Technologies Co., Ltd., Shenzhen (CN)

(72) Inventors: Zhiquan Liao, Dongguan (CN); Zhiqiang Chen, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 453 days.

(21) Appl. No.: 17/859,789

(22) Filed: Jul. 7, 2022

(65) Prior Publication Data

US 2022/0345800 A1 Oct. 27, 2022

Related U.S. Application Data

(63) Continuation of application No. PCT/CN2020/116726, filed on Sep. 22, 2020.

(30) Foreign Application Priority Data

Jan. 8, 2020 (CN) .......................... 202010018687.7

(51) Int. Cl.
*H04B 10/00* (2013.01)
*H04B 10/25* (2013.01)
(Continued)

(52) U.S. Cl.
CPC ......... *H04Q 11/0062* (2013.01); *H04B 10/25* (2013.01); *H04B 10/516* (2013.01); *H04B 10/564* (2013.01); *H04Q 2011/0077* (2013.01)

(58) Field of Classification Search
CPC ............... H04J 14/0256; H04J 14/0258; H04J 14/0261; H04J 14/0264; H04J 14/0267;
(Continued)

(56) References Cited

U.S. PATENT DOCUMENTS 7,447,753 B2 11/2008 Barker
9,525,505 B2 12/2016 Han et al.
(Continued)

FOREIGN PATENT DOCUMENTS

CN 1507765 A 6/2004
CN 101192968 A 6/2008
(Continued)

*Primary Examiner* — Daniel G Dobson
(74) *Attorney, Agent, or Firm* — Slater Matsil, LLP

(57) ABSTRACT

Embodiments of the present application disclose an optical fiber connection detection method and a related device. A first network device obtains first label information, which indicates a target optical output interface, and the target optical output interface is one of at least one optical output interface of the first network device; the first network device generates an optical signal, where a wavelength of the optical signal is within a wavelength range corresponding to the target optical output interface; the first network device modulates the first label information onto the optical signal, to generate a modulated optical signal; and the first network device sends the modulated optical signal from the target optical output interface to a target optical input interface of a second network device, to detect an optical fiber connection relationship between the target optical output interface and the target optical input interface.

20 Claims, 12 Drawing Sheets

(51) Int. Cl.
*H04B 10/516* (2013.01)
*H04B 10/564* (2013.01)
*H04Q 11/00* (2006.01)
*H04J 14/00* (2006.01)

(58) Field of Classification Search
CPC . H04J 14/0272; H04J 14/0273; H04J 14/0276
See application file for complete search history.

(56) References Cited

U.S. PATENT DOCUMENTS

| | | |
|---|---|---|
| 2003/0058790 A1 | 3/2003 | Nagamine |
| 2003/0103252 A1* | 6/2003 | Liu ..................... H04J 14/0276 398/58 |
| 2005/0038901 A1 | 2/2005 | Barker |
| 2005/0286893 A1 | 12/2005 | Horiuchi et al. |
| 2013/0028594 A1 | 1/2013 | Li |
| 2013/0051794 A1 | 2/2013 | Han et al. |
| 2014/0140704 A1* | 5/2014 | Chen ................... H04J 14/0241 398/115 |
| 2016/0065305 A1 | 3/2016 | Endo et al. |
| 2016/0173194 A1 | 6/2016 | Zhou et al. |
| 2021/0021347 A1* | 1/2021 | Nakada ................ H04B 10/506 |

FOREIGN PATENT DOCUMENTS

| | | |
|---|---|---|
| CN | 101345584 A | 1/2009 |
| CN | 101459487 A | 6/2009 |
| CN | 102396172 A | 3/2012 |
| CN | 102907028 A | 1/2013 |
| CN | 103248420 A | 8/2013 |
| CN | 103368643 A | 10/2013 |
| CN | 104348644 A | 2/2015 |
| CN | 107846298 A | 3/2018 |
| CN | 109698758 A | 4/2019 |
| KR | 20160094049 A | 8/2016 |
| WO | 2021223088 A1 | 11/2021 |

* cited by examiner

OPTICAL FIBER CONNECTION DETECTION METHOD AND RELATED DEVICE

CROSS-REFERENCE TO RELATED APPLICATIONS

This application is a continuation of International Application No. PCT/CN2020/116726, filed on Sep. 22, 2020, which claims priority to Chinese Patent Application No. 202010018687.7, filed on Jan. 8, 2020. The disclosures of the aforementioned applications are hereby incorporated by reference in their entireties.

TECHNICAL FIELD

This application relates to optical fiber communications, and in particular, to an optical fiber connection detection method and a related device.

BACKGROUND

An optical fiber communications system is a communications system in which light serves as a carrier, an optical fiber serves as a transmission medium, and light is used to transmit information through photoelectric conversion. The optical fiber communications system includes different network devices, and a large quantity of optical fibers are required between the different network devices to transmit an optical signal.

To manage and maintain the optical fiber communications system, an optical fiber connection relationship between the different network devices needs to be manually identified. Then the identified optical fiber connection relationship is manually input to a network management device.

However, because the optical fiber connection relationship is manually identified, there is a high probability that the identified optical fiber connection relationship is incorrect. For example, a single-point four-dimensional reconfigurable optical add/drop multiplexer (reconfigurable optical add drop multiplexer, ROADM) has nearly 70 optical ports. Each optical port is connected to an optical fiber. If the optical fiber communications system includes many ROADMs, manually identifying an optical fiber connection relationship of each optical port in each ROADM results in very heavy workload and is cumbersome. This greatly reduces efficiency of identifying an optical fiber connection, and reduces accuracy of identifying the optical fiber connection relationship.

SUMMARY

This application provides an optical fiber connection detection method and a related device, to resolve a technical problem of how to automatically detect an optical fiber connection relationship between network devices.

According to a first aspect, an embodiment of the present invention provides an optical fiber connection detection method. The method includes: A first network device obtains first label information, where the first label information is used to indicate a target optical output interface, the first network device has at least one optical output interface, and the target optical output interface is one of the at least one optical output interface; the first network device generates an optical signal, where a wavelength of the optical signal is within a wavelength range corresponding to the target optical output interface; the first network device modulates the first label information onto the optical signal, to generate a modulated optical signal; and the first network device sends the modulated optical signal from the target optical output interface to a target optical input interface of a second network device, to detect an optical fiber connection relationship between the target optical output interface and the target optical input interface.

In this implementation, the first network device automatically detects the optical fiber connection relationship between the target optical output interface and the target optical input interface by sending the modulated optical signal that carries the first label information to the second network device, without manual intervention in a detection process, thereby improving efficiency and accuracy of optical fiber connection detection.

According to the first aspect, in an optional implementation, that the first network device generates an optical signal includes: The first network device obtains wavelength indication information, where the wavelength indication information is used to indicate the wavelength range of the target optical output interface; and the first network device generates the optical signal based on the wavelength indication information.

In this implementation, the first network device generates the optical signal based on the wavelength indication information, and the wavelength of the optical signal is within the wavelength range of the target optical output interface, so that the optical signal can be sent only from the target optical output interface to the target optical input interface of the second network device, to detect the optical fiber connection relationship between the target optical output interface and the target optical input interface.

According to the first aspect, in an optional implementation, the first label information includes at least the wavelength indication information.

In this implementation, if the first label information includes the wavelength indication information, the first network device may generate the optical signal based on the wavelength indication information included in the first label information, and modulate the first label information onto the optical signal, thereby improving efficiency of detecting the optical fiber connection relationship of the target optical output interface.

According to the first aspect, in an optional implementation, the first network device is connected to a network management device, and that a first network device obtains first label information includes: The first network device receives the first label information from the network management device.

In this implementation, when the network management device determines that the optical fiber connection relationship of the target optical output interface of the first network device needs to be detected, the network management device sends the first label information to the first network device, so that the first network device obtains the first label information, thereby effectively ensuring automatic detection on the optical fiber connection relationship.

According to the first aspect, in an optional implementation, the first network device is connected to a network management device, and before a first network device obtains the first label information, the method further includes: The first network device receives indication information from the network management device, where the indication information is used to trigger detection on an optical fiber connection of the first network device. That a first network device obtains first label information includes:

The first network device generates the first label information based on the indication information.

In this implementation, the network management device sends the indication information to the first network device, to trigger the first network device to determine the target optical output interface whose optical fiber connection relationship needs to be detected. This effectively reduces an amount of information that needs to be processed by the network management device to detect the optical fiber connection relationship, and improves efficiency of detecting the optical fiber connection relationship.

According to the first aspect, in an optional implementation, that the first network device generates the first label information based on the indication information includes: The first network device detects whether the target optical output interface is occupied by an optical service signal; and if the target optical output interface is not occupied by an optical service signal, the first network device generates the first label information based on the indication information.

In this implementation, if the first network device determines that an optical output interface is occupied by an optical service signal, it can be learned that an optical fiber connection relationship of the optical output interface is already stored on the network management device, and therefore the optical fiber connection relationship of the optical output interface does not need to be detected. This avoids a case in which optical fiber connection detection on the optical output interface causes interference to the optical service signal transmitted by the optical output interface.

According to the first aspect, in an optional implementation, that the first network device modulates the first label information onto the optical signal, to generate a modulated optical signal includes: The first network device changes power intensity of the optical signal based on the first label information, to generate the modulated optical signal.

In this implementation, the first network device modulates the first label information onto the optical signal by changing the power intensity of the optical signal. On an optical fiber communications network, the first label information has a unique correspondence with the target optical output interface, so that the optical fiber connection relationship of the target optical output interface can be accurately detected based on the first label information, thereby implementing automatic detection on the optical fiber connection relationship of the target optical output interface.

According to the first aspect, in an optional implementation, the first network device includes a plurality of optical output interfaces, different optical output interfaces are coupled to different lasers, and that the first network device generates an optical signal includes: The first network device determines a target laser coupled to the target optical output interface; and the first network device generates the optical signal by using the target laser.

In this implementation, the first network device includes a plurality of lasers, and different lasers are coupled to different optical output interfaces. In a process of detecting the optical fiber connection relationship of the target optical output interface, the optical signal may be output by using a laser coupled to the target optical output interface. In this implementation, optical fiber connection relationships of a plurality of optical output interfaces may be detected simultaneously, thereby effectively improving efficiency of detecting optical fiber connection relationships of the plurality of optical output interfaces included in the first network device.

According to the first aspect, in an optional implementation, after the first network device sends the modulated optical signal from the target optical output interface to the target optical input interface, the method further includes: The first network device receives optical fiber connection indication information, where the optical fiber connection indication information is used to indicate the optical fiber connection relationship between the target optical output interface and the target optical input interface of the second network device.

In this implementation, the first network device receives the optical fiber connection indication information from the second network device, and the first network device may determine the optical fiber connection relationship between the target optical output interface and the target optical input interface based on the optical fiber connection indication information, so that the first network device implements at least some management functions of the network management device based on the optical fiber connection relationship, thereby reducing load of the network management device.

According to the first aspect, in an optional implementation, the first label information includes a first field and a second field, the first field includes an identifier of the target optical output interface, and the second field includes an identifier of the first network device.

According to a second aspect, an embodiment of the present invention provides an optical fiber connection detection method. The method includes: A second network device receives, from a target optical input interface, a modulated optical signal that is from a target optical output interface of a first network device, where the target optical input interface is one of at least one optical input interface of the second network device; the second network device obtains first label information from the modulated optical signal, where the first label information is used to indicate the target optical output interface; and the second network device obtains second label information, where the second label information is used to indicate the target optical input interface, and the first label information and the second label information are used to detect an optical fiber connection relationship between the target optical input interface and the target optical output interface.

In this implementation, the second network device obtains the second label information, so that the optical fiber connection relationship between the target optical output interface and the target optical input interface is detected based on the first label information and the second label information, without manual intervention in a detection process, thereby improving efficiency and accuracy of optical fiber connection detection.

For descriptions of beneficial effects of this aspect, refer to the first aspect. Details are not described again.

According to the second aspect, in an optional implementation, the second network device is connected to a network management device, and the method further includes: The second network device sends the first label information and the second label information to the network management device.

According to the second aspect, in an optional implementation, the method further includes: The second network device detects the optical fiber connection relationship between the target optical input interface and the target optical output interface based on the first label information and the second label information.

According to the second aspect, in an optional implementation, the method further includes: The second network device sends optical fiber connection indication information to the first network device, where the optical fiber connection indication information is used to indicate the optical fiber connection relationship between the target optical input interface and the target optical output interface.

According to the second aspect, in an optional implementation, the second network device is connected to a network management device, and the method further includes: The second network device sends optical fiber connection indication information to the network management device, where the optical fiber connection indication information is used to indicate the optical fiber connection relationship between the target optical input interface and the target optical output interface.

According to the second aspect, in an optional implementation, that the second network device obtains first label information from the modulated optical signal includes: The second network device obtains the first label information based on a change of power intensity of the modulated optical signal.

According to a third aspect, an embodiment of the present invention provides an optical fiber connection detection method. The method includes: A network management device receives first label information and second label information from a second network device, where the first label information is used to indicate a target optical output interface of a first network device, and the second label information is used to indicate a target optical input interface of the second network device; and the network management device detects an optical fiber connection relationship between the target optical input interface and the target optical output interface based on the first label information and the second label information.

For descriptions of beneficial effects of this aspect, refer to the first aspect. Details are not described again.

According to the third aspect, in an optional implementation, before the network management device receives the first label information and the second label information from the second network device, the method further includes: The network management device sends the first label information to the first network device.

According to the third aspect, in an optional implementation, the first label information includes wavelength indication information, and the wavelength indication information is used to indicate a wavelength range of the target optical output interface.

According to the third aspect, in an optional implementation, before the network management device receives the first label information and the second label information from the second network device, the method further includes: The network management device sends indication information to the first network device, where the indication information is used to trigger detection on an optical fiber connection of the first network device.

According to the third aspect, in an optional implementation, before the network management device sends the indication information to the first network device, the method further includes: The network management device determines that the target optical output interface is not occupied by an optical service signal.

According to a fourth aspect, an embodiment of the present invention provides a first network device, including a label loader, a laser, a demultiplexer, and at least one optical output interface that are sequentially coupled.

The label loader is configured to obtain first label information, where the first label information is used to indicate a target optical output interface, the first network device has at least one optical output interface, and the target optical output interface is one of the at least one optical output interface. The laser is configured to generate an optical signal, where a wavelength of the optical signal is within a wavelength range corresponding to the target optical output interface. The laser is further configured to modulate the first label information onto the optical signal, to generate a modulated optical signal. The demultiplexer is configured to send the modulated optical signal from the target optical output interface to a target optical input interface of a second network device, to detect an optical fiber connection relationship between the target optical output interface and the target optical input interface.

For descriptions of beneficial effects of this aspect, refer to the first aspect. Details are not described again.

According to the fourth aspect, in an optional implementation, the first network device further includes a control and communications interface. The control and communications interface is configured to obtain wavelength indication information, where the wavelength indication information is used to indicate the wavelength range of the target optical output interface. The label loader is further configured to generate the optical signal based on the wavelength indication information.

According to the fourth aspect, in an optional implementation, the first label information includes at least the wavelength indication information.

According to the fourth aspect, in an optional implementation, the control and communications interface is further configured to receive the first label information from a network management device.

According to the fourth aspect, in an optional implementation, the control and communications interface is further configured to receive indication information from the network management device, where the indication information is used to trigger detection on an optical fiber connection of the first network device. The label loader is further configured to generate the first label information based on the indication information.

According to the fourth aspect, in an optional implementation, the label loader is further configured to detect whether the target optical output interface is occupied by an optical service signal. If the target optical output interface is not occupied by an optical service signal, the label loader generates the first label information based on the indication information.

According to the fourth aspect, in an optional implementation, the label loader is further configured to change power intensity of the optical signal based on the first label information, to generate the modulated optical signal.

According to the fourth aspect, in an optional implementation, the label loader is further configured to: determine a target laser coupled to the target optical output interface, and generate the optical signal by using the target laser.

According to the fourth aspect, in an optional implementation, the control and communications interface is further configured to receive optical fiber connection indication information, where the optical fiber connection indication information is used to indicate the optical fiber connection relationship between the target optical output interface and the target optical input interface of the second network device.

According to the fourth aspect, in an optional implementation, the first label information includes a first field and a second field, the first field includes an identifier of the target optical output interface, and the second field includes an identifier of the first network device.

According to a fifth aspect, an embodiment of the present invention provides a second network device, including a plurality of optical input interfaces and a label receiver that are sequentially coupled. The label receiver is configured to: receive, from a target optical input interface, a modulated optical signal that is from a target optical output interface of a first network device, where the target optical input interface is one of at least one optical input interface; obtain first label information from the modulated optical signal, where the first label information is used to indicate the target optical output interface; and obtain second label information, where the second label information is used to indicate the target optical input interface, and the first label information and the second label information are used to detect an optical fiber connection relationship between the target optical input interface and the target optical output interface.

For descriptions of beneficial effects of this aspect, refer to the second aspect. Details are not described again.

According to the fifth aspect, in an optional implementation, the second network device further includes a control and communications interface. The control and communications interface is configured to send the first label information and the second label information to a network management device.

According to the fifth aspect, in an optional implementation, the label receiver is further configured to detect the optical fiber connection relationship between the target optical input interface and the target optical output interface based on the first label information and the second label information.

According to the fifth aspect, in an optional implementation, the control and communications interface is further configured to send optical fiber connection indication information to the first network device, where the optical fiber connection indication information is used to indicate the optical fiber connection relationship between the target optical input interface and the target optical output interface.

According to the fifth aspect, in an optional implementation, the control and communications interface is further configured to send optical fiber connection indication information to the network management device, where the optical fiber connection indication information is used to indicate the optical fiber connection relationship between the target optical input interface and the target optical output interface.

According to the fifth aspect, in an optional implementation, the label receiver is further configured to obtain the first label information based on a change of power intensity of the modulated optical signal.

According to a sixth aspect, an embodiment of the present invention provides a network management device, including a network interface, a processor, and a memory that are sequentially connected by using a bus. The network interface is configured to receive first label information and second label information from a second network device, where the first label information is used to indicate a target optical output interface of a first network device, and the second label information is used to indicate a target optical input interface of the second network device. The processor is configured to detect an optical fiber connection relationship between the target optical input interface and the target optical output interface based on the first label information and the second label information.

For descriptions of beneficial effects of this aspect, refer to the third aspect. Details are not described again.

According to the sixth aspect, in an optional implementation, the network interface is further configured to send the first label information to the first network device.

According to the sixth aspect, in an optional implementation, the first label information includes wavelength indication information, and the wavelength indication information is used to indicate a wavelength range of the target optical output interface.

According to the sixth aspect, in an optional implementation, the network interface is further configured to send indication information to the first network device, where the indication information is used to trigger detection on an optical fiber connection of the first network device.

According to the sixth aspect, in an optional implementation, the processor is further configured to determine that the target optical output interface is not occupied by an optical service signal.

BRIEF DESCRIPTION OF THE DRAWINGS

FIG. 3A-1 and FIG. 3A-2 are a flowchart of steps of a first embodiment of an optical fiber connection detection method according to this application;

DETAILED DESCRIPTION OF ILLUSTRATIVE EMBODIMENTS

The following clearly describes the technical solutions in embodiments of the present invention with reference to the accompanying drawings in embodiments of the present invention. It is clear that the described embodiments are merely some rather than all of embodiments of the present invention. All other embodiments obtained by persons skilled in the art based on embodiments of the present invention without creative efforts shall fall within the protection scope of the present invention.

Figure 1:
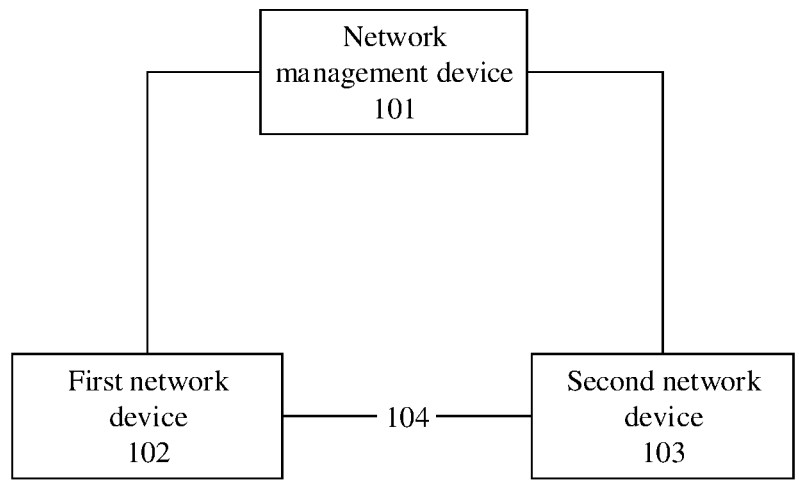
FIG. 1 is an example diagram of a first structure of an optical fiber communications system according to an embodiment of this application.

To help better understand an optical fiber connection detection method provided in this application, the following first describes, with reference to FIG. 1, an optical fiber communications system to which the optical fiber connection detection method is applied.

As shown in FIG. 1, the optical fiber communications system in this embodiment includes a network management device 101, a first network device 102, and a second network device 103. In this embodiment, that the network management device 101 is separately connected to the first network device 102 and the second network device 103 is used as an example for description. In another example, the network management device 101 may be connected only to the first network device 102. For another example, the network management device 101 may be connected only to the second network device 103.

The connection in this embodiment may be a direct connection. For example, the network management device 101 is directly connected to the first network device 102. In this case, the network management device 101 may be directly connected to the first network device 102 in a physical manner, for example, by using a network cable, or may be directly connected to the first network device 102 in a wireless manner or the like.

Alternatively, the connection in this embodiment may be an indirect connection. For example, the network management device 101 is indirectly connected to the second network device 103. In this case, the network management device 101 may be indirectly connected through another network device (for example, a network device that is included in the optical fiber communications system and that is different from the second network device 103).

The first network device 102 and the second network device 103 are connected by using an optical fiber 104. The first network device 102, the second network device 103, and the network management device 101 may be located on a same communications device, or may be located on different communications devices. This is not specifically limited. The communications device may be a box-shaped device, a frame-shaped device, or the like.

It should be noted that specific quantities of first network devices 102 and second network devices 103 are not limited in this embodiment, provided that the first network device 102 and the second network device 103 are any group of network devices that are included in the optical fiber communications system and that are connected by using an optical fiber.

The network management device 101 can implement a management function on the first network device 102 and the second network device 103 based on an optical fiber connection relationship between the first network device 102 and the second network device 103. The management function may be implementing fault analysis, fault locating, service allocation, and the like. This is not specifically limited in this embodiment.

Device types of the first network device 102 and the second network device 103 are not limited in this embodiment. For example, the first network device 102 may be a wavelength selective switch (WSS), and the second network device 103 may be a wavelength transponder unit (optical transponder unit, OTU). For another example, the first network device 102 may be a demultiplexer, and the second network device 103 may be a wavelength transponder unit.

Figure 2:
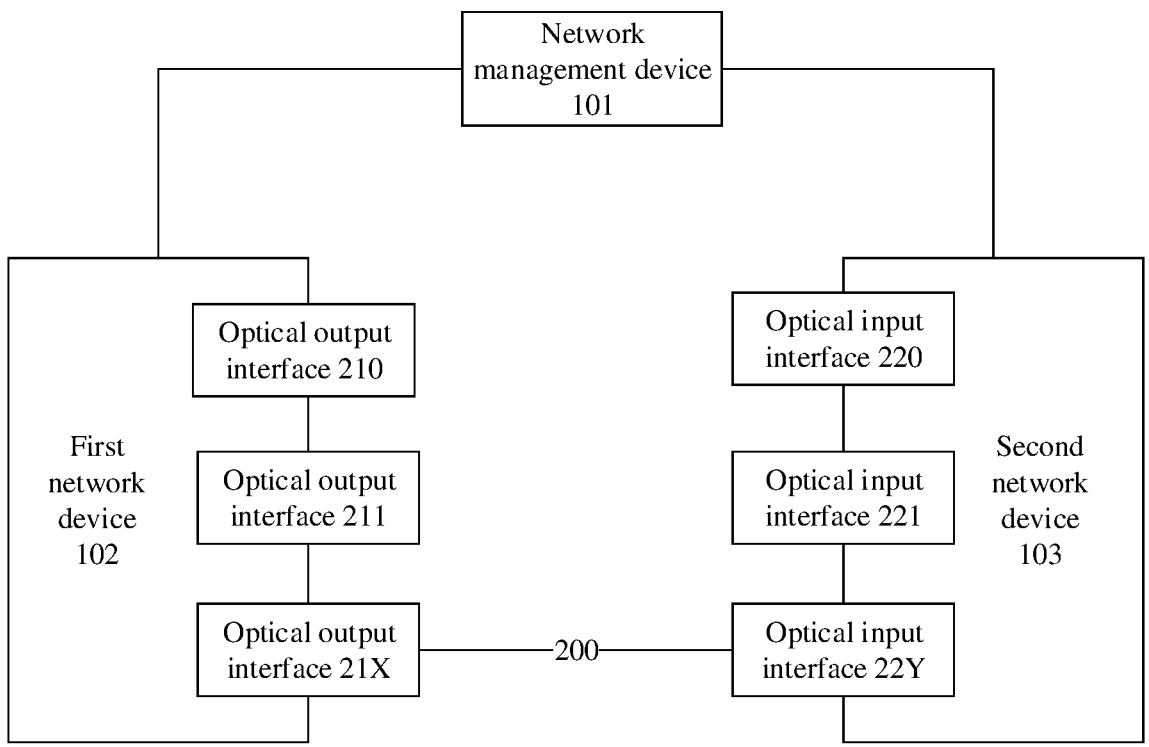
FIG. 2 is an example diagram of a second structure of an optical fiber communications system according to an embodiment of this application.

The following describes an application scenario of the optical fiber connection detection method in this application with reference to FIG. 2.

As shown in FIG. 2, the first network device 102 has X optical output interfaces (an optical output interface 210, and an optical output interface 211 to an optical output interface 21X). The second network device 103 has Y optical input interfaces (an optical input interface 220, and an optical input interface 221 to an optical input interface 22Y). Specific values of X and Y are not limited in this embodiment, provided that both X and Y are positive integers greater than or equal to 1. An example in which both X and Y are positive integers greater than 1 is used for description below.

To implement optical service signal interaction between the first network device 102 and the second network device 103, the optical output interface 21X of the first network device has been connected to the optical input interface 22Y of the second network device 103 by using an optical fiber 200. In addition, no optical service signal interaction has been performed between the optical output interface 21X and the optical input interface 22Y.

An objective of the optical fiber connection detection method provided in this application is to automatically detect an optical fiber connection relationship between the optical output interface 21X of the first network device 102 and the optical input interface 22Y of the second network device 103 among a plurality of network devices included in an optical fiber communications network, without manual intervention.

Figures 1, 3A:
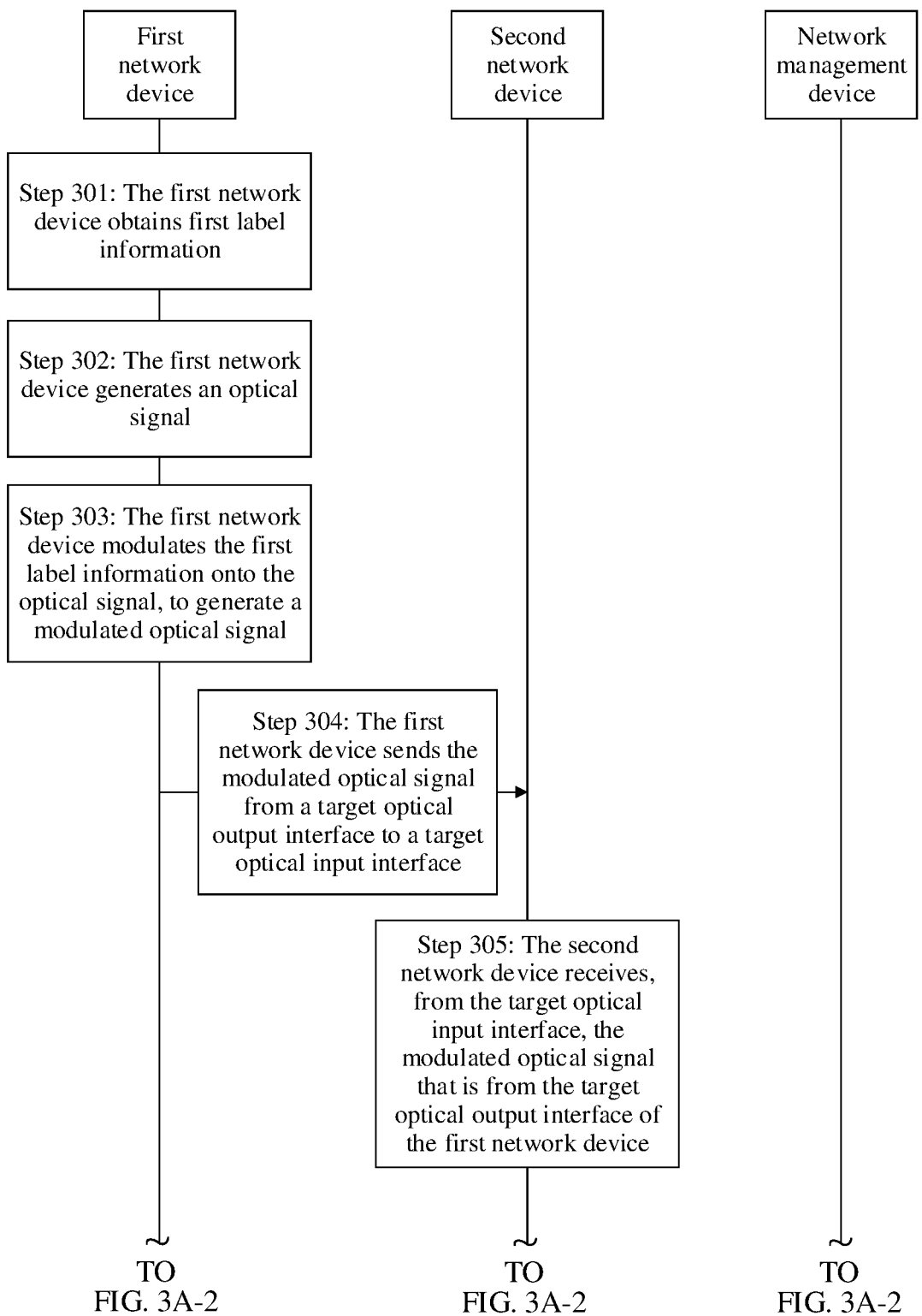
Figures 2, 3A:
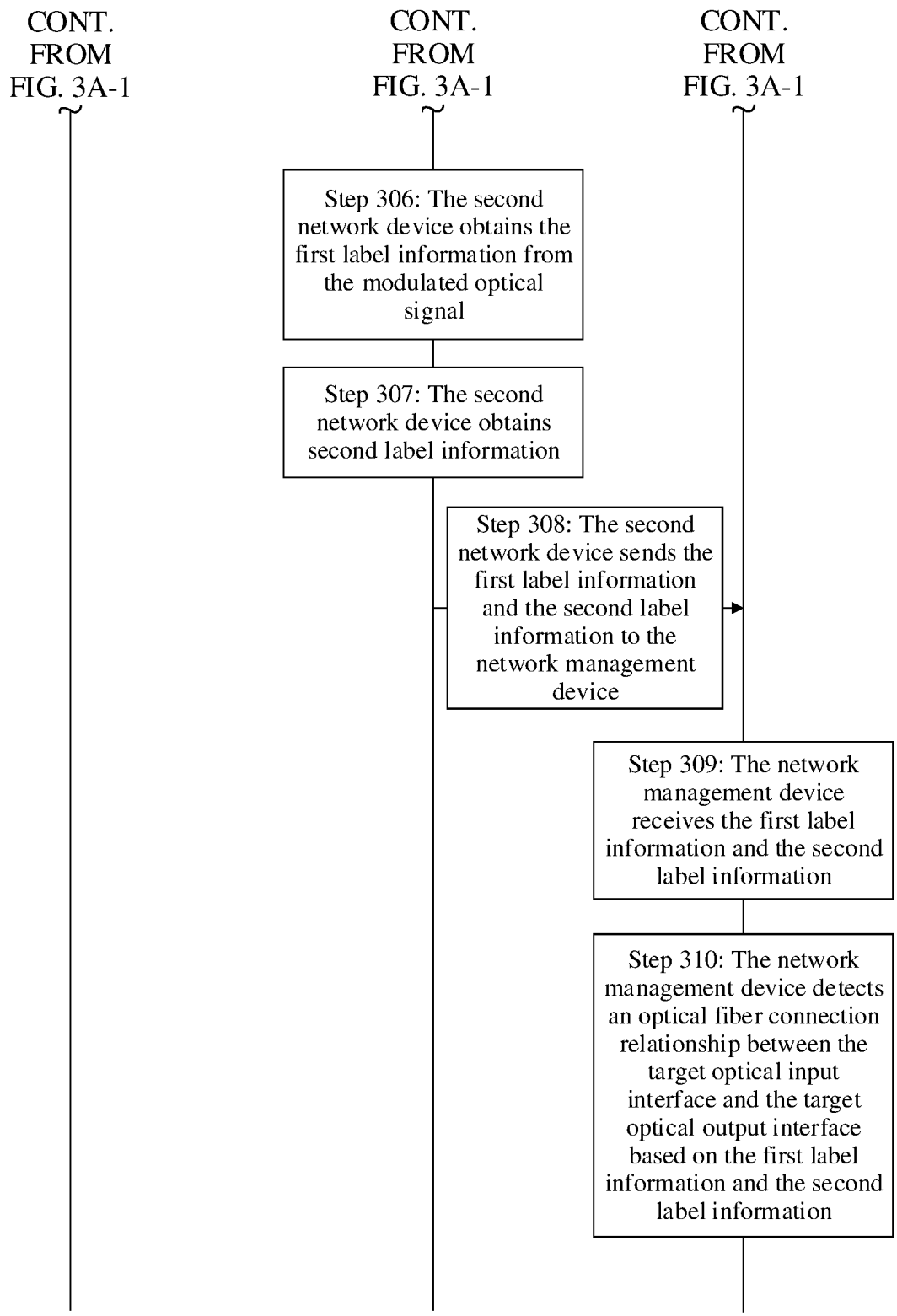

The following describes a specific process of the optical fiber connection detection method provided in this embodiment with reference to FIG. 3A-1 and FIG. 3A-2.

Step 301: A first network device obtains first label information.

The first label information is used to indicate a target optical output interface of the first network device. The target optical output interface is one of at least one optical output interface of the first network device. For example, the target optical output interface is the optical output interface 21X shown in FIG. 2.

Specific content included in the first label information is not limited in this embodiment, provided that the first label information has a unique correspondence with the target optical output interface on the optical fiber communications network. The following describes specific content included in the first label information. For example, the first label information includes an identifier of the target optical output interface. The identifier of the target optical output interface may be one or more of the following:

a port number of the target optical output interface or attribute information of the target optical output interface.

Specific content of the attribute information of the target optical output interface is not limited in this embodiment, provided that the attribute information can indicate at least some attributes of the target optical output interface. For example, the attribute information includes rate information and/or wavelength indication information. The rate information is used to indicate a bearer rate corresponding to the target optical output interface. The wavelength indication information is used to indicate a wavelength range of the target optical output interface.

For another example, the first label information includes the identifier of the target optical output interface and an identifier of the first network device. The identifier of the first network device is one or more of the following:

a device number of the first network device, a rack number of the first network device, a subrack number of the first network device, or a slot number of the first network device.

A specific source of the first label information is not limited in this embodiment. For example, if a network management device needs to detect an optical fiber connection relationship of the target optical output interface, the network management device sends the first label information to the first network device. For another example, if the first network device needs to detect the optical fiber connection relationship of the target optical output interface, the first network device generates the first label information.

Step 302: The first network device generates an optical signal.

Still using FIG. 2 as an example, to avoid crosstalk between optical signals transmitted by different optical output interfaces in the first network device 102, different optical output interfaces correspond to different wavelength ranges. For example, the optical output interface 210 corresponds to a first wavelength range, the optical output interface 211 corresponds to a second wavelength range, and the optical output interface 21X corresponds to an $(X+1)^{th}$ wavelength range. In addition, the first wavelength range, the second wavelength range, and the $(X+1)^{th}$ wavelength range are different from each other. In addition, the optical output interface 210 is configured to transmit only an optical signal whose wavelength is within the first wavelength range. By analogy, the optical output interface 21X is configured to transmit only an optical signal whose wavelength is within the $(X+1)^{th}$ wavelength range.

It can be learned that, if the optical fiber connection relationship of the target optical output interface needs to be detected, a wavelength of the obtained optical signal is within the wavelength range corresponding to the target optical output interface. Still using the optical output interface 21X as an example, to detect an optical fiber connection relationship of the optical output interface 21X, the wavelength of the optical signal is within the $(X+1)^{th}$ wavelength range.

A chronological order of performing step 301 and step 302 is not limited in this embodiment.

Step 303: The first network device modulates the first label information onto the optical signal, to generate a modulated optical signal.

In this embodiment, when obtaining the first label information and the optical signal, the first network device may modulate the first label information onto the optical signal, to generate the modulated optical signal. It can be learned that a wavelength of the modulated optical signal is within the wavelength range corresponding to the target optical output interface, and the modulated optical signal carries the first label information.

Figure 3B:
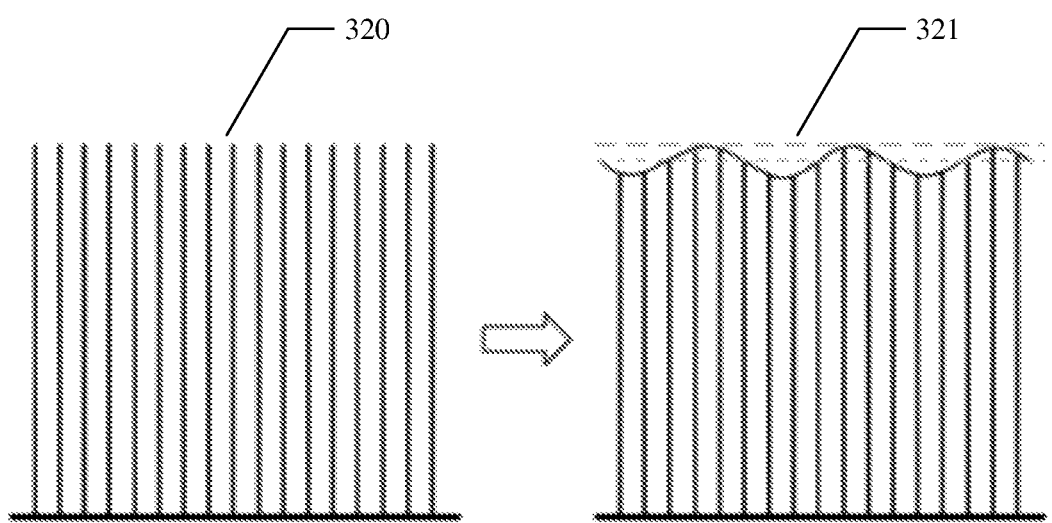
FIG. 3B is an example diagram of a scenario of an optical signal generated by a first network device according to an embodiment of this application.

Specifically, as shown in FIG. 3B, an optical signal 320 shown on a left side of FIG. 3B is an optical signal to which the first label information has not been loaded. The first label information is loaded to the optical signal 320 to form a modulated optical signal 321 shown on a right side of FIG. 3B. Using the modulated optical signal 321 as an example, a horizontal direction of the modulated optical signal 321 indicates time, and a vertical direction indicates power intensity. By comparing the optical signal 320 with the modulated optical signal 321, it can be learned that the first network device changes power intensity of the optical signal based on the first label information, to generate the modulated optical signal. That is, the modulated optical signal carries the first label information through the change of the power intensity.

Step 304: The first network device sends the modulated optical signal from the target optical output interface to a target optical input interface.

The wavelength of the modulated optical signal is within the wavelength range corresponding to the target optical output interface. It can be learned that, even if the first network device has a plurality of optical output interfaces, the modulated optical signal is output from the first network device only through the target optical output interface.

As shown in FIG. 2, it can be learned that there is already an optical fiber connection relationship between the target optical output interface 21X and the target optical input interface 22Y. The modulated optical signal output from the target optical output interface 21X is transmitted to the target optical input interface 22Y through the optical fiber 200.

Step 305: A second network device receives, from the target optical input interface, the modulated optical signal that is from the target optical output interface of the first network device.

The target optical input interface in this embodiment is one of at least one optical input interface of the second network device. In addition, the target optical input interface is connected to the target optical output interface by using an optical fiber.

Step 306: The second network device obtains the first label information from the modulated optical signal.

In this embodiment, the second network device splits the modulated optical signal to separate an optical detection signal from the modulated optical signal. For example, 1% of the modulated optical signal is separated as the optical detection signal. The second network device performs photoelectric conversion on the optical detection signal to form an electrical detection signal. The second network device may obtain the first label information based on a change of power intensity of the electrical detection signal. For details about specific descriptions of the first label information, refer to step 301. Details are not described again.

Step 307: The second network device obtains second label information.

In this embodiment, when the second network device receives the modulated optical signal from the target optical input interface, the second network device generates the second label information based on the target optical input interface. Specifically, the second network device performs detection on the optical input interface of the second network device. If it is detected that the target optical input interface receives the modulated optical signal, the second network device may obtain the second label information used to indicate the target optical input interface.

Optionally, as shown in FIG. 2, a label list is prestored on the second network device 103, and the label list includes correspondences between different optical input interfaces and different label information. When the second network device 103 receives the modulated optical signal from the target optical input interface 22Y, the second network device 103 determines, based on the label list, that label information corresponding to the target optical input interface 22Y is the second label information.

The second label information is used to indicate the target optical input interface. Specific content included in the second label information is not limited in this embodiment, provided that the second label information has a unique correspondence with the target optical input interface on the optical fiber communications network. The following describes specific content included in the second label information.

For example, the second label information includes an identifier of the target optical input interface. The identifier of the target optical input interface may be one or more of the following:

a port number of the target optical input interface or attribute information of the target optical input interface. For descriptions of the port number and the attribute information, refer to step 301. Details are not described again.

For another example, the second label information includes the identifier of the target optical input interface and an identifier of the second network device. The identifier of the second network device is one or more of the following:

a device number of the second network device, a rack number of the second network device, a subrack number of the second network device, or a slot number of the second network device.

Step 308: The second network device sends the first label information and the second label information to the network management device.

In this embodiment, to detect an optical fiber connection relationship between the target optical output interface and the target optical input interface, the second network device sends both the obtained first label information and second label information to the network management device.

Step 309: The network management device receives the first label information and the second label information.

Step 310: The network management device detects the optical fiber connection relationship between the target optical input interface and the target optical output interface based on the first label information and the second label information.

It can be learned from the foregoing descriptions that the first label information is used to indicate the target optical output interface, and the second label information is used to indicate the target optical input interface. The network management device may detect the optical fiber connection relationship between the target optical input interface and the target optical output interface based on the first label information and the second label information that are from the second network device.

As shown in FIG. 2, the network management device 101 receives the first label information and the second label information from the second network device 103. The first label information is used to indicate the optical output interface 21X, and the second label information is used to indicate the optical input interface 22Y. The network management device 101 may determine that there is an optical fiber connection relationship between the optical output interface 21X and the optical input interface 22Y.

The network management device may implement a network management function for the first network device 102 and the second network device 103 based on the optical fiber connection relationship. For descriptions of the network management function, refer to FIG. 1. Details are not described again.

Optionally, the network management device may generate optical fiber connection indication information. The optical fiber connection indication information is used to indicate the optical fiber connection relationship between the target optical output interface and the target optical input interface. The network management device may send the optical fiber connection indication information to the first network device and/or the second network device. Therefore, the first network device and/or the second network device that receive/receives the optical fiber connection indication information may perform at least some network management functions, thereby reducing load of the network management device.

In this embodiment, that the network management device is responsible for detecting the optical fiber connection relationship between the target optical output interface and the target optical input interface is used as an example for description, but is not construed as a limitation. In another example, the second network device may alternatively detect the optical fiber connection relationship between the target optical output interface and the target optical input interface based on the first label information and the second label information. For a process of performing optical fiber connection detection by the second network device, refer to the process of performing optical fiber connection detection by the network management device in step 310. Details are not described again. In this example, the second network device generates the optical fiber connection indication information. The second network device may send the optical fiber connection indication information to the first network device and/or the network management device.

According to the method in this embodiment, the first network device automatically detects the optical fiber connection relationship between the target optical output interface and the target optical input interface by sending the modulated optical signal that carries the first label information to the second network device, without manual intervention in a detection process, thereby improving efficiency and accuracy of optical fiber connection detection.

Figure 4A:
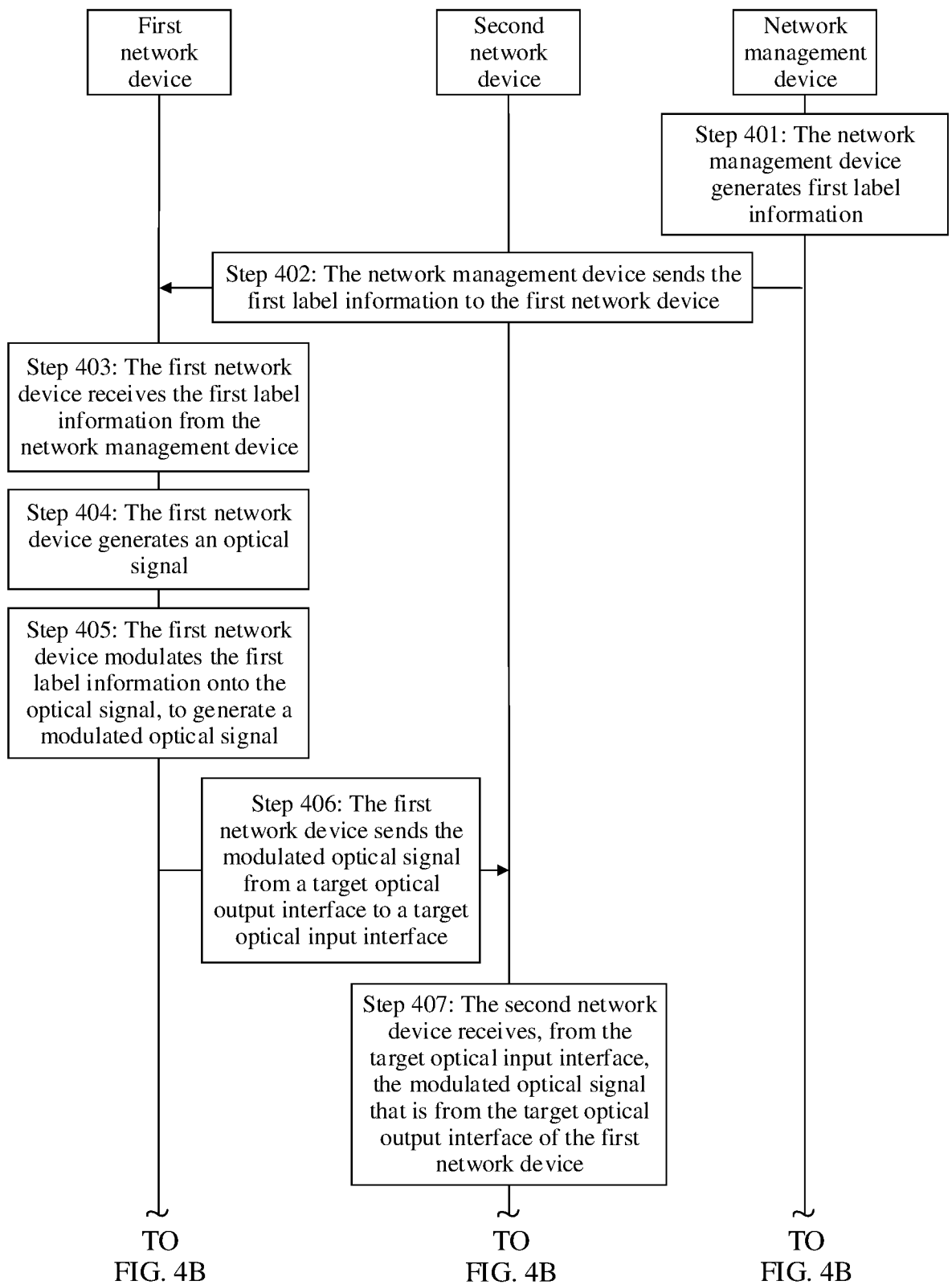
FIG. 4A and FIG. 4B are a flowchart of steps of a second embodiment of an optical fiber connection detection method according to this application.
Figure 4B:
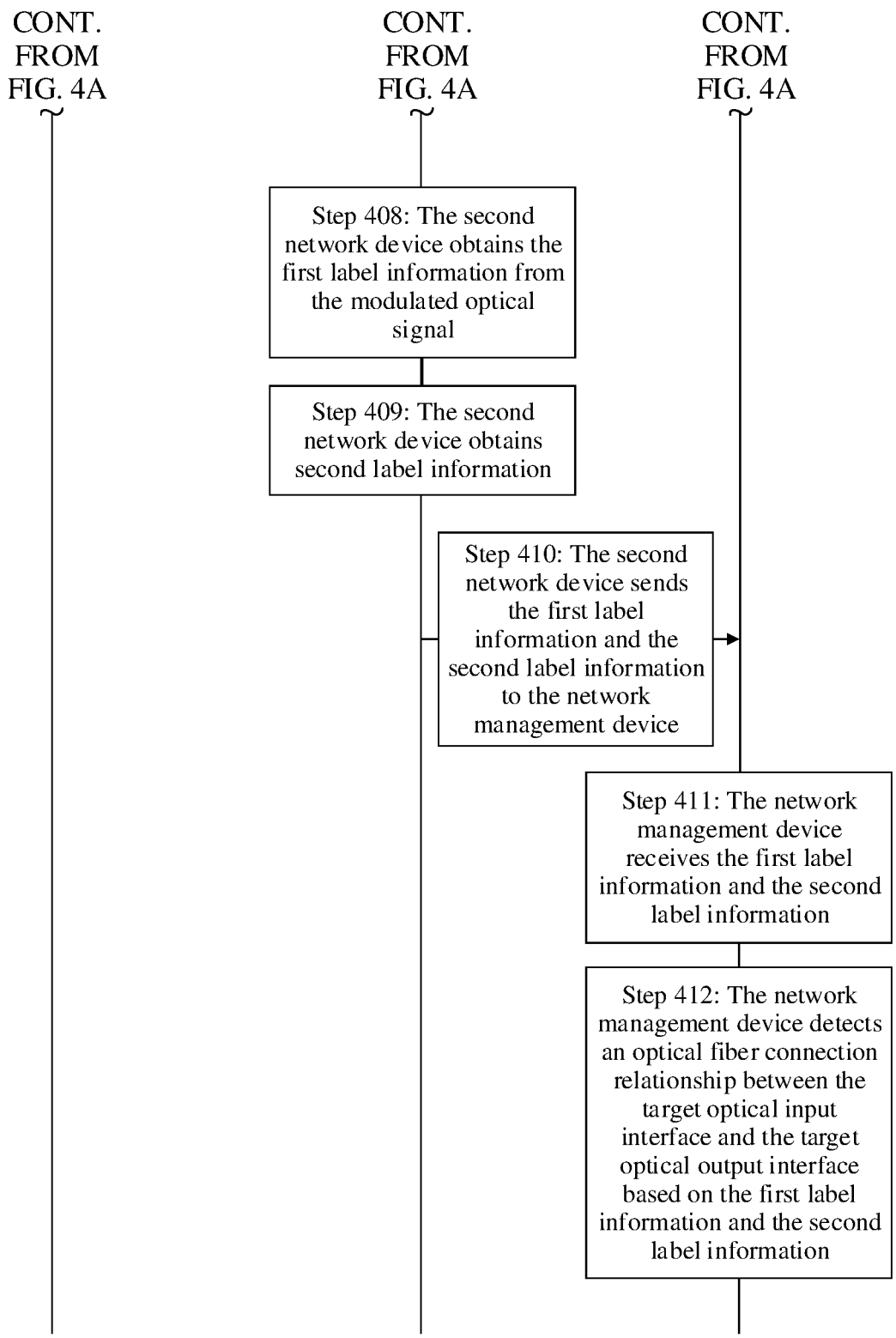

It can be learned from the embodiment shown in FIG. 3A-1 and FIG. 3A-2 that the first network device automatically detects the optical fiber connection relationship between the target optical output interface and the target optical input interface based on the first label information. With reference to FIG. 4A and FIG. 4B, the following describes how a process of detecting an optical fiber connection relationship is implemented if the first label information is generated by the network management device.

Step 401: A network management device generates first label information.

In this embodiment, the network management device determines a target optical output interface whose optical fiber connection relationship needs to be detected, and generates the first label information based on the target optical output interface. The following describes several optional manners of generating the first label information by the network management device.

Manner 1

The network management device may prestore an optical output interface list. The optical output interface list includes identifiers of all optical output interfaces included in a first network device. As shown in FIG. 2, the optical output interface list includes an identifier of the optical output interface 210, and identifiers of the optical output interface 211 to the optical output interface 21X.

The network management device may send, one by one through polling as first label information, the identifiers of all the optical output interfaces that are included in the optical output interface list to the first network device. For example, the network management device may first send the identifier of the optical output interface 210 as the first label information to the first network device. The first network device detects an optical fiber connection relationship of the optical output interface 210 based on the first label information. By analogy, the network management device finally sends the identifier of the optical output interface 21X as first label information to the first network device. The first network device detects an optical fiber connection relationship of the optical output interface 21X based on the first label information.

Manner 2

The network management device detects whether each optical output interface of the first network device is occupied by an optical service signal. As shown in FIG. 2, if the network management device determines that the optical output interface 21X is not occupied by an optical service signal, the network management device may determine that the optical output interface 21X is the target optical output interface whose optical fiber connection relationship needs to be detected. The network management device generates first label information used to indicate the optical output interface 21X.

Manner 3

The network management device stores optical fiber connection lists for different network devices. Using the first network device as an example, the optical fiber connection list includes optical fiber connection relationships of all optical output interfaces included in the first network device. If no optical fiber connection relationship of the target optical output interface is stored in the optical fiber connection list, the network management device may generate the first label information for the target optical output interface.

The following describes specific content included in the first label information.

Content 1

The first label information includes a first field. The first field includes an identifier of the target optical output interface. For details about specific descriptions of the identifier of the target optical output interface, refer to the embodiment shown in FIG. 3A-1 and FIG. 3A-2. Details are not described again.

Content 2

The first label information includes a first field and a second field. For details about descriptions of the first field, refer to the content 1. Details are not described again. The second field includes an identifier of the first network device. For details about specific descriptions of the identifier of the first network device, refer to the embodiment shown in FIG. 3A-1 and FIG. 3A-2. Details are not described again.

Step 402: The network management device sends the first label information to the first network device.

Step 403: The first network device receives the first label information from the network management device.

Step 404: The first network device generates an optical signal.

For details about specific descriptions of the optical signal, refer to step 302. Details are not described again. The following describes several optional generation manners of generating the optical signal in this embodiment.

Generation Manner 1:

The first label information includes wavelength indication information. For details about specific descriptions of the wavelength indication information, refer to the content 1. Details are not described again.

The first network device may extract the wavelength indication information from the first label information, and then send the wavelength indication information to a laser. For descriptions of the laser, refer to FIG. 3A-1 and FIG. 3A-2. Details are not described again. The laser may generate the optical signal based on the wavelength indication information.

Generation Manner 2:

The first network device directly sends the received first label information to a laser. The laser extracts wavelength indication information from the first label information. The laser generates the optical signal based on the extracted wavelength indication information.

Generation Manner 3:

The first label information in this manner does not include wavelength indication information. The first network device prestores a wavelength list. The wavelength list includes correspondences between different optical output interfaces of the first network device and different wavelength indication information.

When receiving the first label information, the first network device may determine the target optical output interface indicated by the first label information. The first network device determines, based on the wavelength list, wavelength indication information corresponding to the target optical output interface. The first network device sends the wavelength indication information to a laser. The laser may generate the optical signal based on the wavelength indication information.

Generation Manner 4:

The first label information in this manner does not include wavelength indication information. The first network device directly sends the first label information to a laser. The laser generates the optical signal based on a prestored wavelength list and the first label information. For a specific process, refer to the manner 3. Details are not described again.

The following describes several optional setting manners of the laser responsible for generating the optical signal in this embodiment.

Setting Manner 1

Figure 5:
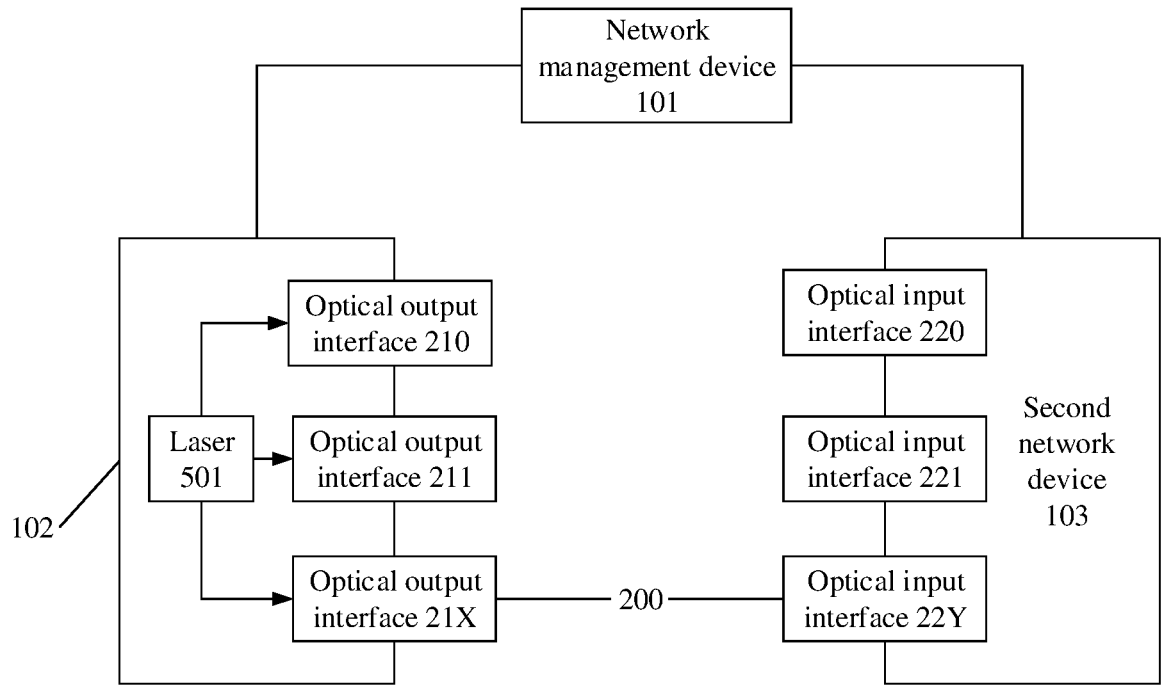
FIG. 5 is an example diagram of a third structure of an optical fiber communications system according to an embodiment of this application.

As shown in FIG. 5, the first network device includes a laser 501 configured to generate the optical signal. The laser 501 generates optical signals used to detect optical fiber connection relationships of different optical output interfaces. For a process of generating the optical signal by the laser 501, refer to the generation manner 1 to the generation manner 4. Details are not described again.

Setting Manner 2

Figure 6:
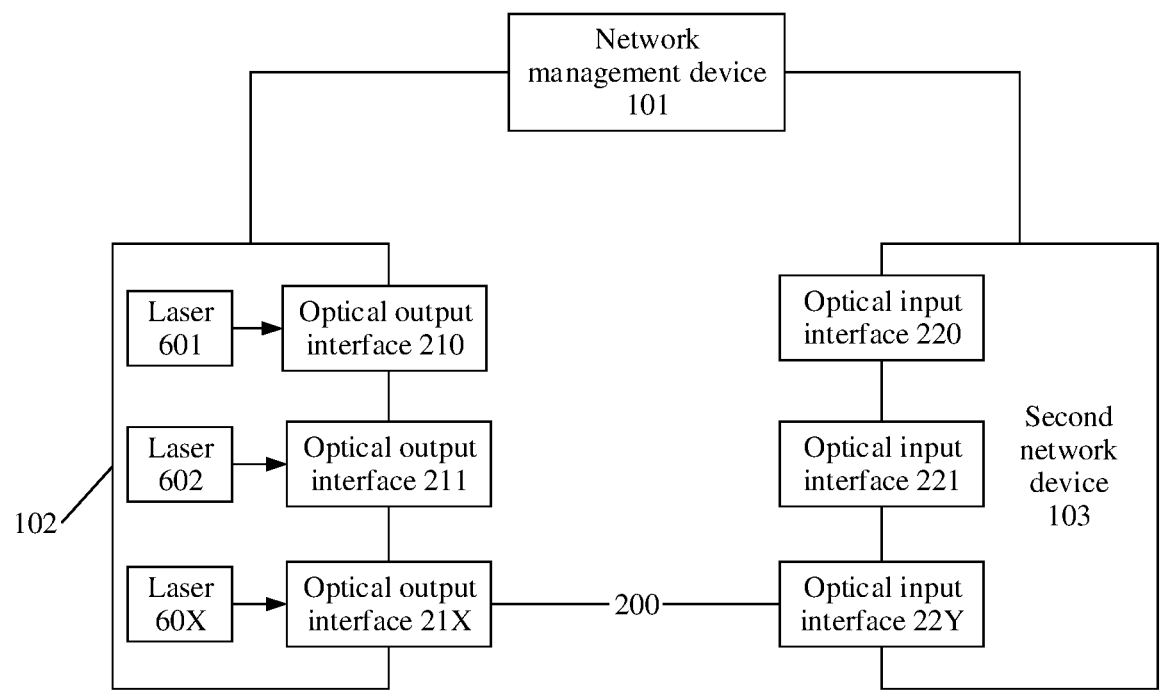
FIG. 6 is an example diagram of a fourth structure of an optical fiber communications system according to an embodiment of this application.

As shown in FIG. 6, a plurality of lasers (a laser 601, and a laser 602 to a laser 60X) are disposed in the first network device, and the plurality of lasers are respectively coupled to a plurality of optical output interfaces.

For example, if an optical fiber connection relationship of the optical output interface 21X needs to be detected, the first network device may generate the optical signal by using the laser 60X coupled to the optical output interface 21X. For a generation process, refer to the generation manner 1 to the generation manner 4. Details are not described again.

Step 405: The first network device modulates the first label information onto the optical signal, to generate a modulated optical signal.

In this embodiment, the first network device sends the first label information to the laser, and the laser modulates the first label information onto the optical signal, to generate the modulated optical signal.

In this embodiment, that the laser has a modulation function is used as an example for description. If the laser has no modulation function, a modulator is coupled to the laser. The modulator obtains the first label information and the optical signal that is from the laser. The modulator is configured to modulate the first label information onto the optical signal, to generate the modulated optical signal.

Step 406: The first network device sends the modulated optical signal from the target optical output interface to a target optical input interface.

Step 407: A second network device receives, from the target optical input interface, the modulated optical signal that is from the target optical output interface of the first network device.

Step 408: The second network device obtains the first label information from the modulated optical signal.

Step 409: The second network device obtains second label information.

Step 41o: The second network device sends the first label information and the second label information to the network management device.

Step 411: The network management device receives the first label information and the second label information.

Step 412: The network management device detects an optical fiber connection relationship between the target optical input interface and the target optical output interface based on the first label information and the second label information.

For details about processes in step 406 to step 412 in this embodiment, refer to step 304 to step 310. Details are not described again.

According to the method in this embodiment, the network management device sends the first label information to the first network device, and indicates, by using the first label information, the target optical output interface whose optical fiber connection relationship needs to be detected. After receiving the first label information, the first network device may directly detect the optical fiber connection relationship based on the first label information. This effectively reduces an amount of data processed by the first network device, reduces load of the first network device, implements automatic detection on the optical fiber connection relationship, and improves efficiency and accuracy of optical fiber connection detection.

For example, the first network device has 40 optical output interfaces, and the optical output interfaces are connected to different second network devices. That is, the first network device is connected to 40 second network devices through optical fibers by using the 40 optical output interfaces. When the first network device performs the method in this embodiment, each second network device reports first label information and second label information in the foregoing manner, so that the network management device determines an optical output interface, of the first network device, that is connected to each of the 40 second network devices. This process takes only approximately 2 minutes. However, it takes approximately 1.5 hours to manually detect an optical fiber connection relationship in the same scenario. It can be learned that efficiency of detecting an optical fiber connection relationship can be improved by using the method in this embodiment.

Figure 7A:
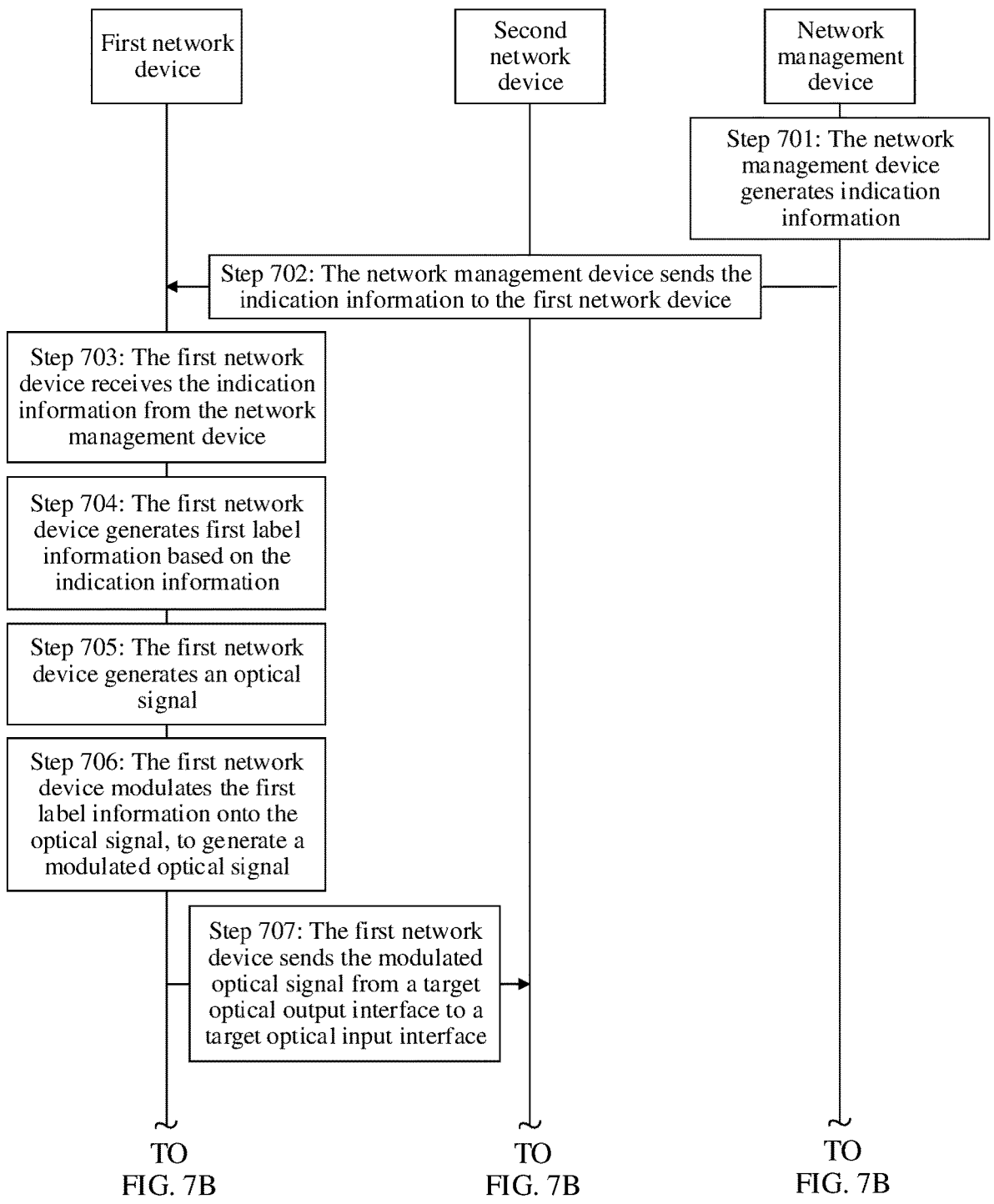
FIG. 7A and FIG. 7B are a flowchart of steps of a third embodiment of an optical fiber connection detection method according to this application.
Figure 7B:
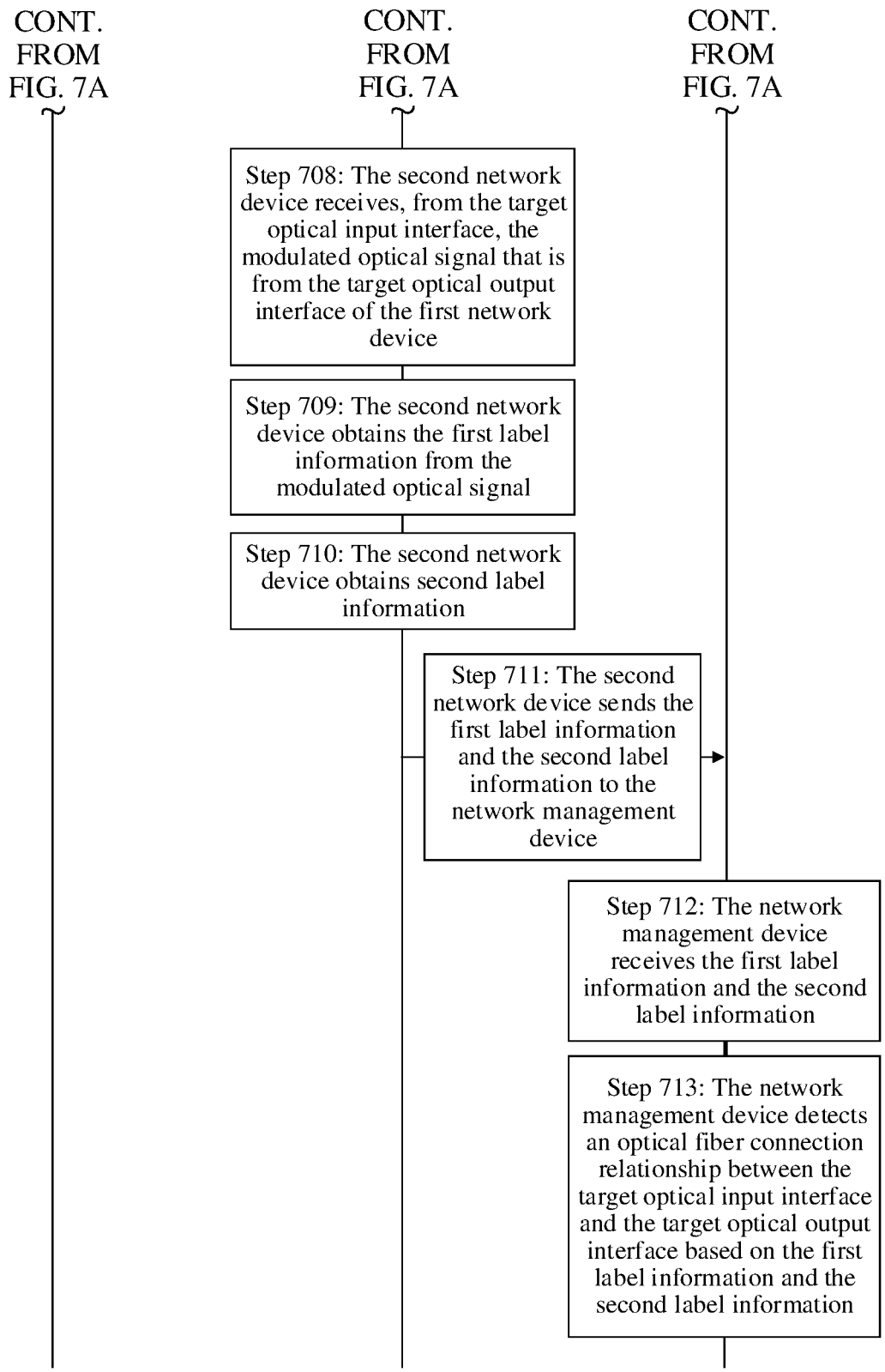

In the embodiment shown in FIG. 4A and FIG. 4B, the network management device is responsible for generating the first label information. With reference to FIG. 7A and FIG. 7B, the following describes how a process of detecting an optical fiber connection relationship is implemented if the first label information is generated by the first network device.

Step 701: A network management device generates indication information.

In this embodiment, the network management device determines, in an optical fiber communications system, a first network device on which an optical fiber connection relationship needs to be detected. However, a specific optical output interface, in the first network device, whose optical fiber connection relationship needs to be detected is determined by the first network device.

Specifically, the network management device may generate the indication information after determining the first network device on which an optical fiber connection relationship needs to be detected. The indication information is used to trigger detection on an optical fiber connection of the first network device.

Specific content of the indication information is not limited in this embodiment. For example, the indication information may be any information on which the network management device and the first network device pre-negotiate, provided that the indication information is on the network management device and the first network device, and indicated content is to trigger detection on the optical fiber connection of the first network device. For another example, the indication information may be alternatively an identifier of the first network device. When the first network device receives the identifier of the first network device, the first network device may determine that an optical fiber connection relationship needs to be detected. For details about specific descriptions of the identifier of the first network device, refer to step 401. Details are not described again.

Step 702: The network management device sends the indication information to the first network device.

Step 703: The first network device receives the indication information from the network management device.

Step 704: The first network device generates first label information based on the indication information.

In this embodiment, when the first network device receives the indication information, the first network device selects a target optical output interface whose optical fiber connection relationship needs to be detected. For a specific process of selecting the target optical output interface by the first network management device, refer to the following optional selection manners.

Selection Manner 1

The first network device prestores an optical output interface list. For specific descriptions of the optical output interface list, refer to step 401. Details are not described again.

The first network device may determine, one by one through polling, all optical output interfaces included in the optical output interface list as the target optical output interface.

Selection Manner 2

The first network device detects whether each optical output interface is occupied by an optical service signal. As shown in FIG. 2, if the first network device determines that the optical output interface 21X is not occupied by an optical service signal, the first network device may determine that the optical output interface 21X is the target optical output interface whose optical fiber connection relationship needs to be detected.

Selection Manner 3

The first network device stores an optical fiber connection list. For descriptions of the optical fiber connection list, refer to step 401. Details are not described again. As shown in FIG. 2, if the first network device determines that no optical fiber connection relationship of the optical output interface 210 is stored in the optical fiber connection list, the first network device may determine that the optical output interface 210 is the target optical output interface.

When the target optical output interface is determined by the first network device, the first network device may generate the first label information. For details about descriptions of specific content of the first label information, refer to step 401. Details are not described again.

Step 705: The first network device generates an optical signal.

Step 706: The first network device modulates the first label information onto the optical signal, to generate a modulated optical signal.

Step 707: The first network device sends the modulated optical signal from the target optical output interface to a target optical input interface.

Step 708: A second network device receives, from the target optical input interface, the modulated optical signal that is from the target optical output interface of the first network device.

Step 709: The second network device obtains the first label information from the modulated optical signal.

Step 710: The second network device obtains second label information.

Step 711: The second network device sends the first label information and the second label information to the network management device.

Step 712: The network management device receives the first label information and the second label information.

Step 713: The network management device detects an optical fiber connection relationship between the target optical input interface and the target optical output interface based on the first label information and the second label information.

For details about processes in step 705 to step 713 in this embodiment, refer to step 404 to step 412. Details are not described again.

According to the method in this embodiment, the first network device generates the first label information, and detects the optical fiber connection relationship of the target optical output interface by using the first label information. The first network device may directly detect the optical fiber connection relationship based on the first label information, thereby implementing automatic detection on the optical fiber connection relationship, and improving efficiency and accuracy of optical fiber connection detection.

Figure 8:
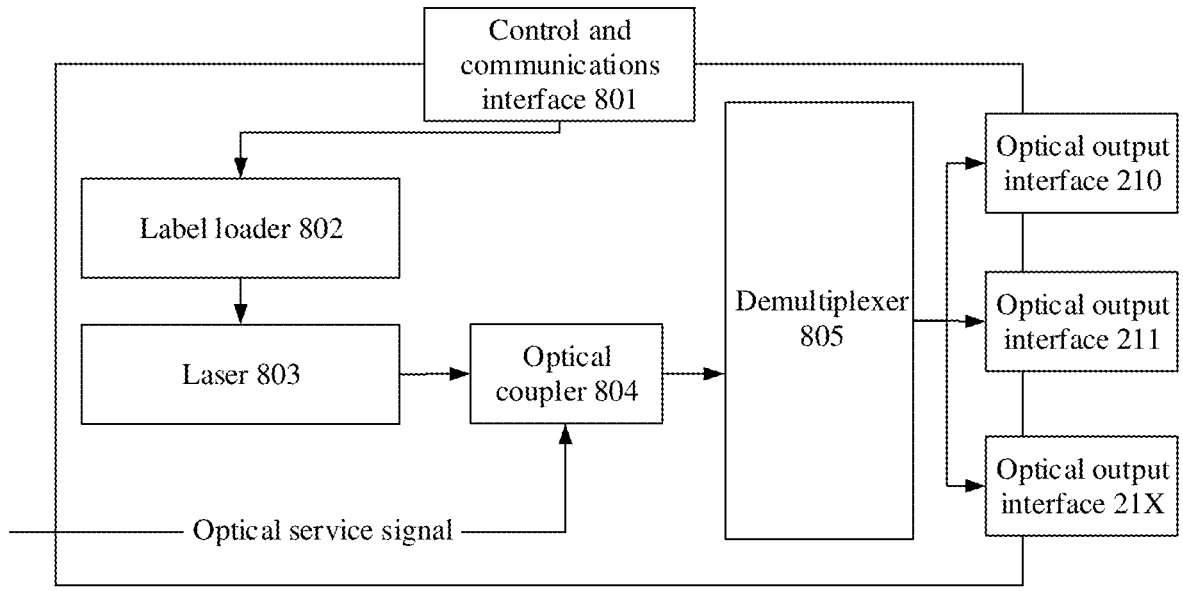
FIG. 8 is an example diagram of a structure of a first embodiment of a first network device according to this application.

The following describes an example of a specific structure of a first network device provided in this application with reference to FIG. 8.

As shown in FIG. 8, the first network device includes a control and communications interface 801, a label loader 802, a laser 803, an optical coupler 804, a demultiplexer 805, and at least one optical output interface.

The control and communications interface 801 is configured to exchange information with a network management device. The control and communications interface 801, the label loader 802, the laser 803, the optical coupler 804, the demultiplexer 805, and the at least one optical output interface are sequentially coupled. In this embodiment, that the first network device includes a plurality of optical output interfaces is used as an example. The plurality of optical output interfaces specifically include an optical output interface 210, and an optical output interface 211 to an optical output interface 21X. For details about specific descriptions, refer to FIG. 2. Details are not described again.

A device form of the label loader 802 is not limited in this embodiment. For example, the label loader 802 may be one or more field-programmable gate arrays FPGAs), application-specific integrated circuits (application specific integrated circuits, ASICs), systems on chips (SoCs), central processing units (CPUs), digital signal processors (DSPs), micro controller units (MCUs), programmable logic devices (PLDs), or other integrated chips, or any combination of the foregoing chips or processors.

For example, with reference to the embodiment shown in FIG. 3A-1 and FIG. 3A-2, the label loader 802 is configured to perform step 301, or the label loader 802 and the laser 803 jointly perform step 301. The laser 803 is configured to perform step 302 and step 303. The laser 803 is further configured to send an output modulated optical signal to the optical coupler 804.

For another example, with reference to the embodiment shown in FIG. 4A and FIG. 4B, or FIG. 7A and FIG. 7B, the control and communications interface 801 is configured to receive first label information from the network management device. For a specific process, refer to step 403 shown in FIG. 4A and FIG. 4B. Alternatively, the control and communications interface 801 is configured to receive indication information from the network management device. For a specific process, refer to step 703 shown in FIG. 7A and FIG. 7B. The control and communications interface 801 is configured to send the first label information or the indication information to the label loader 802.

With reference to the generation manner 1 in step 404, the label loader 802 is configured to extract wavelength indication information from the first label information. With reference to the generation manner 2 or 4, the label loader 802 is configured to send the received first label information to the laser 803. With reference to the generation manner 3, the label loader 802 is configured to determine, based on a wavelength list, wavelength indication information corresponding to the target optical output interface. With reference to step 704, the label loader 802 is configured to generate the first label information. The laser 803 is configured to generate an optical signal. For details about a specific process, refer to step 404. Details are not described again. The laser 803 is further configured to modulate the first label information onto the optical signal, to generate a modulated optical signal. For details about descriptions of a specific process, refer to step 405. The laser 803 is further configured to send the output modulated optical signal to the optical coupler 804.

The optical coupler 804 is configured to receive the modulated optical signal and send the modulated optical signal to the demultiplexer 805.

Optionally, if the optical coupler 804 receives an optical service signal and the optical service signal is an optical signal that carries service data, the optical coupler 804 is configured to couple the optical service signal to the modulated optical signal, and send a coupled optical signal to the demultiplexer 805. A source of the optical service signal is not limited in this embodiment. For example, the optical service signal may be from outside of the first network device. For another example, the optical service signal is from inside of the first network device.

The demultiplexer 805 includes an input port, and the input port is coupled to the optical coupler 804. The demultiplexer 805 further includes a plurality of output ports, and the plurality of output ports are respectively coupled to the plurality of optical output interfaces. The demultiplexer 805 is configured to obtain an optical signal from the optical coupler 804. The demultiplexer 805 outputs the optical signal to a corresponding optical output interface based on a wavelength of the optical signal.

For example, the demultiplexer 805 has received the coupled optical signal that includes the modulated optical signal and the optical service signal. If the demultiplexer 805 determines that a wavelength of the modulated optical signal is within a wavelength range corresponding to the optical output interface 21X, the demultiplexer 805 sends the modulated optical signal to the optical output interface 21X. The optical output interface 21X is configured to send the modulated optical signal to a second network device by using an optical fiber. For a specific sending process, refer to the foregoing method embodiments. Details are not described again. If the demultiplexer 805 determines that a wavelength of the optical service signal is within a wavelength range corresponding to the optical output interface 210, the demultiplexer 805 sends the optical service signal to the optical output interface 210. The optical output interface 210 is configured to send the optical service signal to the second network device by using an optical fiber.

Figure 9:
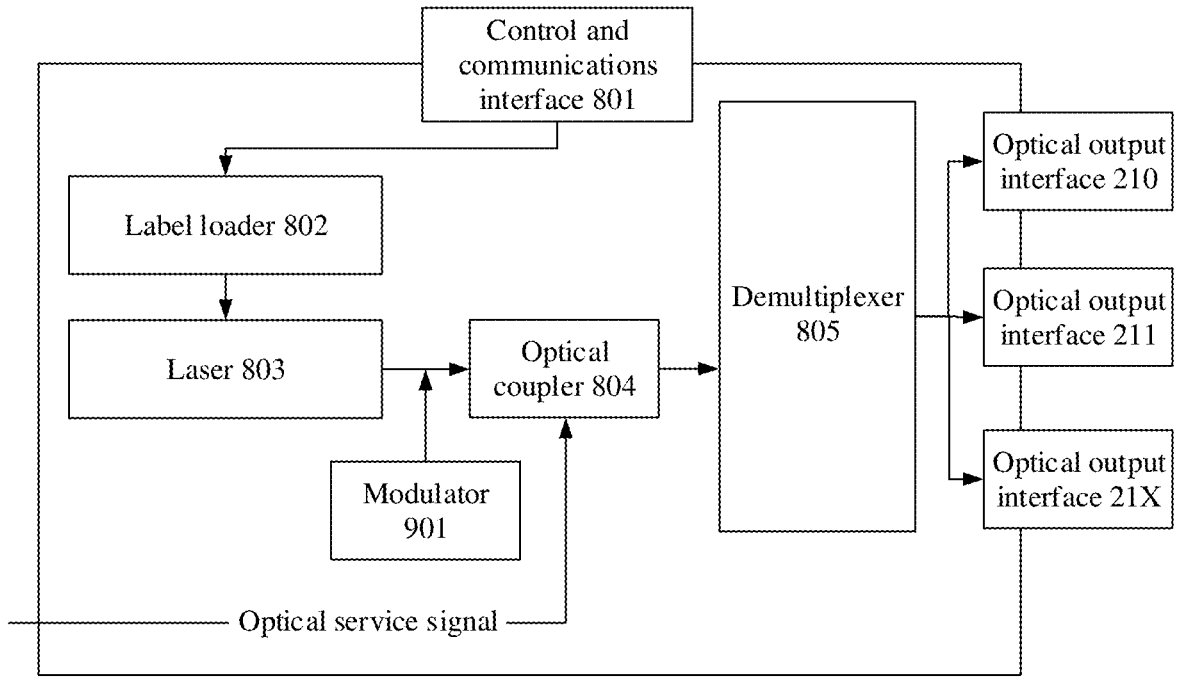
FIG. 9 is an example diagram of a structure of a second embodiment of a first network device according to this application.

Optionally, as shown in FIG. 9, the first network device may further include a modulator 901. The modulator is configured to obtain the first label information from the label loader 802, and modulate the first label information onto the optical signal output by the laser 803.

As shown in FIG. 8 or FIG. 9, an example in which the first network device includes one laser is used for description. The following describes a structure of a first network device including a plurality of lasers in this embodiment with reference to FIG. 10.

Figure 10:
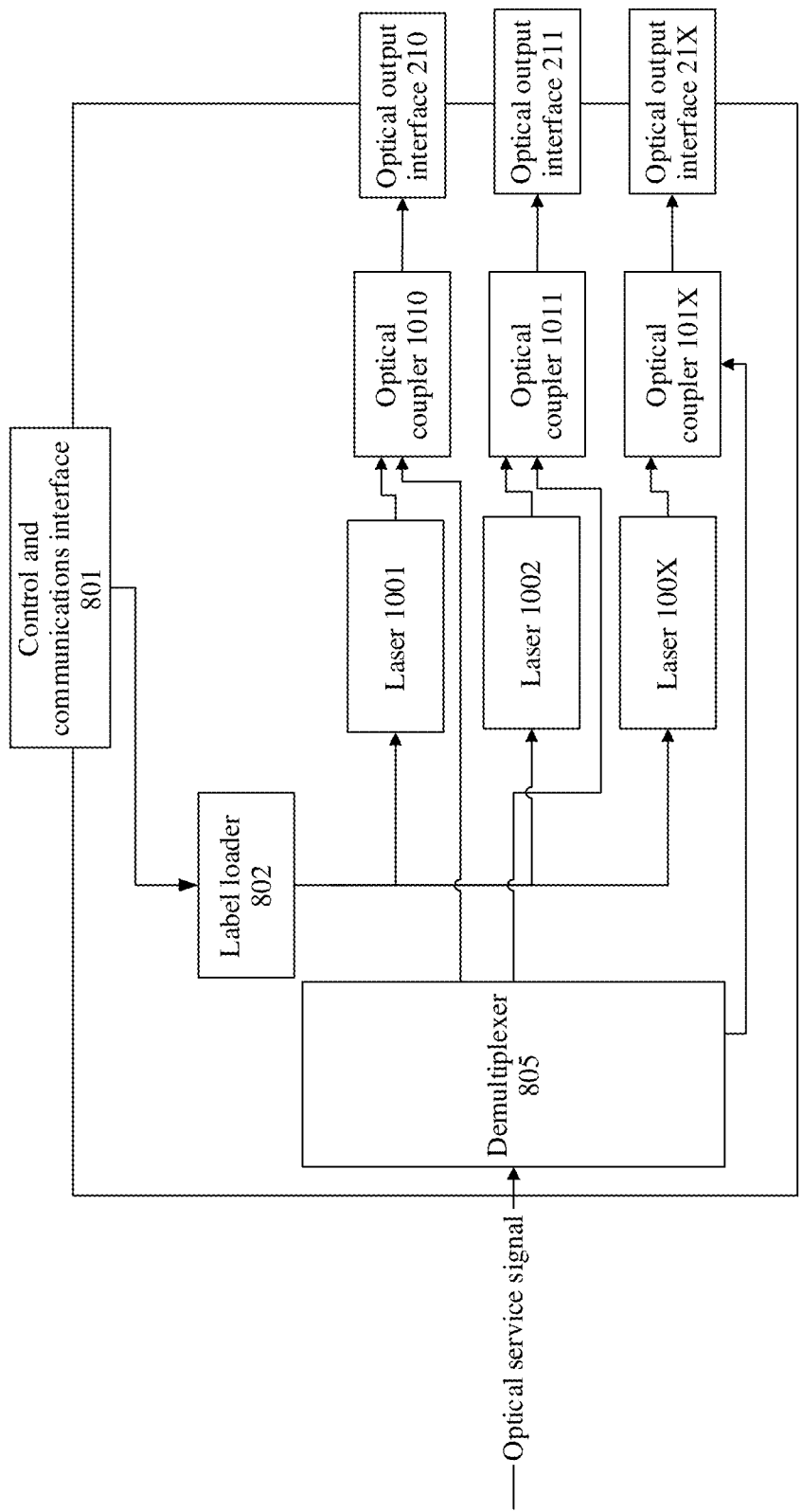
FIG. 10 is an example diagram of a structure of a third embodiment of a first network device according to this application.

As shown in FIG. 10, the first network device includes a control and communications interface 801, a label loader 802, a plurality of lasers 803, a plurality of optical couplers 804, a demultiplexer 805, and a plurality of optical output interfaces.

Specifically, the plurality of lasers may include a laser 1001, and lasers 1002 to 100X. The plurality of optical couplers include an optical coupler 1010, and an optical coupler 1011 to an optical coupler 101X. In this embodiment, that the plurality of lasers, the plurality of optical couplers, and the plurality of optical output interfaces are separately and sequentially coupled is used as an example for description. To be specific, the laser 1001, the optical coupler 1010, and the optical output interface 210 are sequentially coupled; the laser 1002, the optical coupler 1011, and the optical output interface 211 are sequentially coupled; and the laser 100X, the optical coupler 101X, and the optical output interface 21X are sequentially coupled. The demultiplexer 805 is separately coupled to the plurality of lasers. The control and communications interface 801 and the label loader 802 are separately coupled to the plurality of lasers. To transmit an optical service signal, the demultiplexer 805 in this embodiment is further separately coupled to the plurality of optical couplers.

Optionally, in this embodiment, that one laser is coupled to one optical output interface through one optical coupler is used as an example for description. In another example, one laser may be alternatively coupled to a plurality of optical output interfaces through one or more optical couplers. Optionally, a modulator may be further disposed in the first network device in this embodiment. For descriptions of the modulator, refer to FIG. 9. Details are not described again.

For details about descriptions of specific functions of the control and communications interface 801 and the label loader 802 in this embodiment, refer to the embodiment shown in FIG. 8. Details are not described again. In this embodiment, the label loader 802 determines a target optical output interface, and generates a modulated optical signal by using a laser coupled to the target optical output interface. For example, if the label loader 802 determines the target optical output interface 21X, the label loader 802 generates a modulated optical signal by using the laser 100X. For details about a specific generation process, refer to the foregoing method embodiments. Details are not described again. The laser 100X sends the modulated optical signal to the optical coupler 101X. The optical coupler 101X is configured to send the modulated optical signal to the optical output interface 21X. The optical output interface 21X sends the modulated optical signal to a second network device.

A difference between the first network device shown in FIG. 10 and that shown in FIG. 8 further lies in that the demultiplexer 805 receives an optical service signal, and the demultiplexer forwards the optical service signal to a corresponding optical coupler based on a wavelength of the optical service signal. For example, if the demultiplexer 805 determines that the wavelength of the received optical service signal is within a wavelength range corresponding to the optical output interface 210, the demultiplexer 805 sends the optical service signal to the optical coupler 1010 coupled to the optical output interface 210. The optical coupler 1010 sends the received optical service signal to the optical output interface 210. The optical output interface 210 sends the optical service signal to the second network device.

Figure 11:
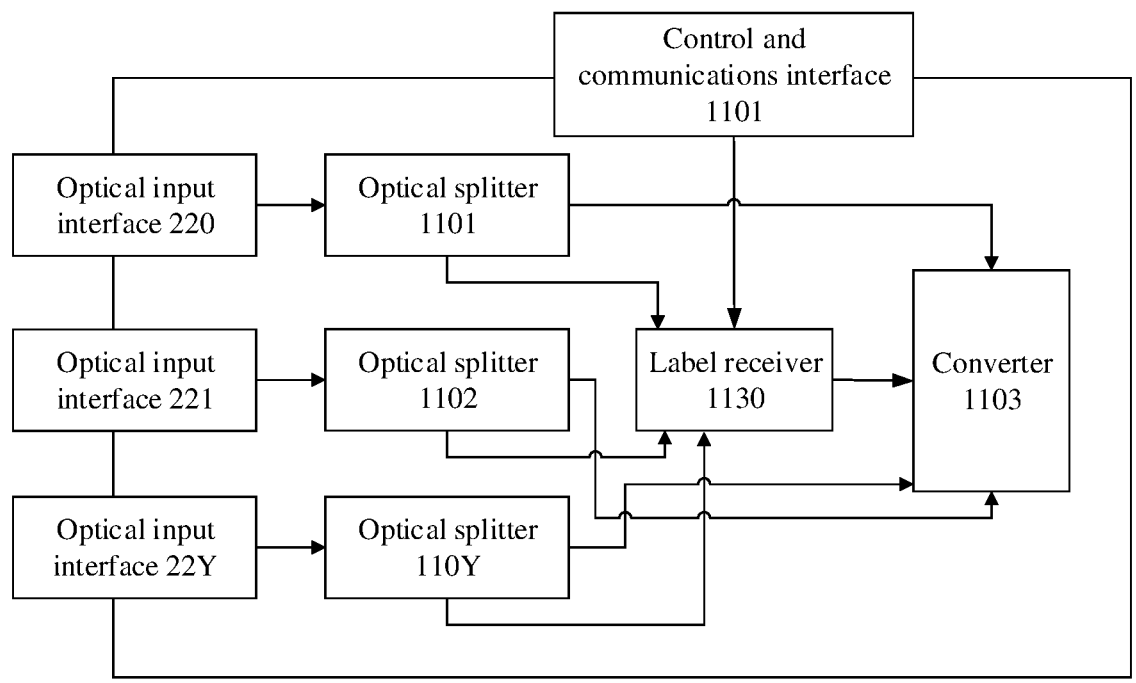
FIG. 11 is an example diagram of a structure of an embodiment of a second network device according to this application.

The following describes an example of a specific structure of a second network device provided in this application with reference to FIG. 11.

As shown in FIG. 11, the second network device includes a control and communications interface 1101, a label receiver 1130, a converter 1103, a plurality of optical input interfaces, and a plurality of optical splitters.

For details about specific descriptions of the plurality of optical input interfaces, that is, an optical input interface 220, and an optical input interface 221 to an optical input interface 22Y, refer to FIG. 2. Details are not described again. The plurality of optical splitters are respectively coupled to the plurality of optical input interfaces. To be specific, the optical input interface 220 is coupled to an optical splitter 1101, the optical input interface 221 is coupled to an optical splitter 1102, and the optical input interface 22Y is coupled to an optical splitter 110Y. In this embodiment, that the plurality of optical input interfaces are respectively coupled to the plurality of optical splitters is used as an example for description. In another example, a plurality of optical input interfaces may be alternatively coupled to one optical splitter. The plurality of optical splitters are coupled to the label receiver 1130. The label receiver 1130 is separately coupled to the converter 1103 and the control and communications interface 1101.

For details about descriptions of the control and communications interface 1101, refer to the descriptions of the control and communications interface 801 shown in FIG. 8. For details about descriptions of a specific device form of the label receiver 113o, refer to the descriptions of the device form of the label loader 802 shown in FIG. 8. Details are not described again.

For example, with reference to FIG. 3A-1 and FIG. 3A-2, a target optical input interface is configured to perform step 305. The optical splitter is configured to split a received optical signal to form an optical detection signal and a to-be-converted optical signal. The optical splitter is configured to send the optical detection signal to the label receiver 1130, and is configured to send the to-be-converted optical signal to the converter 1103. The converter 1103 is configured to convert the to-be-converted optical signal into an optical service signal. Specifically, for example, if the optical input interface 22Y receives an optical signal, the optical splitter 110Y is configured to split the optical signal to form an optical detection signal and a to-be-converted optical signal. For details about specific descriptions of the splitting, refer to step 306. Details are not described again.

The label receiver 1130 is configured to perform step 306 and step 307. The label receiver 1130 sends first label information and second label information to the control and communications interface 1101. The control and communications interface 1101 is configured to perform step 308.

The second network device in this embodiment may also be used in the method embodiment shown in FIG. 4A and FIG. 4B, or FIG. 7A and FIG. 7B. For specific descriptions, refer to the foregoing descriptions of FIG. 3A-1 and FIG. 3A-2. Details are not described again.

Figure 12:
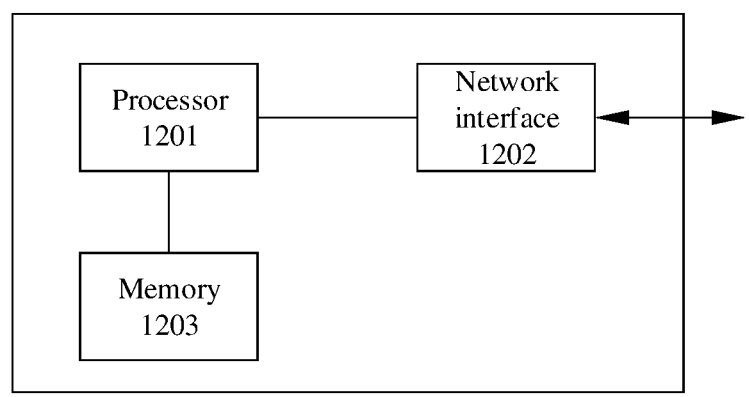
FIG. 12 is an example diagram of a structure of an embodiment of a network management device according to this application.

The following describes a specific structure of a network management device provided in this application with reference to FIG. 12.

As shown in FIG. 12, the network management device includes a network interface 1202, a processor 1201, and a memory 1203 that are sequentially connected by using a bus. The network management device is configured to exchange information with a first network device and a second network device.

The processor 1201 may include one or more central processing units (CPUs). The memory 1203 is configured to store a program. The program may include one or more modules (not shown in the figure), and each module may include a series of instruction operations related to the network management device. Further, the processor 1201 performs the series of instruction operations in the memory 1203.

With reference to the embodiment shown in FIG. 3A-1 and FIG. 3A-2, the network interface 1202 is configured to perform step 309, and the network interface 1202 sends received first label information and second label information to the processor 1201. The processor 1201 is configured to perform step 310.

With reference to the embodiment shown in FIG. 4A and FIG. 4B, the processor 1201 is configured to perform step 401, and send generated first label information to the network interface 1202, and the network interface 1202 is configured to perform step 402. The network interface 1202 is configured to perform step 410, and the network interface 1202 sends received first label information and second label information to the processor 1201. The processor 1201 is configured to perform step 411.

With reference to the embodiment shown in FIG. 7A and FIG. 7B, the processor 1201 is configured to perform step 701, and send generated indication information to the network interface 1202, and the network interface 1202 is configured to perform step 702. The network interface 1202 is configured to perform step 711, and the network interface 1202 sends received first label information and second label information to the processor 1201. The processor 1201 is configured to perform step 712.

The term "and/or" in this application may describe only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In the specification, claims, and accompanying drawings of this application, the terms such as "first" and "second" are intended to distinguish between similar objects but do not necessarily indicate a specific order or sequence. It should be understood that data used in such a way is interchangeable in proper circumstances, so that embodiments described herein can be implemented in other orders than the order illustrated or described herein. In addition, the terms "include", "have", and any other variants are intended to cover non-exclusive inclusions, for example, a process, method, system, product, or device including a series of steps or modules is not necessarily limited to those clearly listed steps or modules, but may include other steps or modules that are not clearly listed or are inherent to such a process, method, product, or device.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of the present invention.

What is claimed is:

1. An method comprising:

obtaining, by a first network device, first label information, wherein the first label information indicates a target optical output interface, the first network device has at least one optical output interface, and the target optical output interface is one of the at least one optical output interface;

generating, by the first network device, an optical signal, wherein a wavelength of the optical signal is within a wavelength range corresponding to the target optical output interface;

modulating, by the first network device, the first label information onto the optical signal, to generate a modulated optical signal; and sending, by the first network device, the modulated optical signal from the target optical output interface to a target optical input interface of a second network device, to detect an optical fiber connection relationship between the target optical output interface and the target optical input interface.

2. The method according to claim 1, wherein generating, by the first network device, the optical signal comprises:

obtaining, by the first network device, wavelength indication information, wherein the wavelength indication information indicates the wavelength range of the target optical output interface; and generating, by the first network device, the optical signal based on the wavelength indication information.

3. The method according to claim 2, wherein the first label information comprises at least the wavelength indication information.

4. The method according to claim 1, wherein the first network device is connected to a network management device, and obtaining, by the first network device, the first label information comprises:

receiving, by the first network device, the first label information from the network management device.

5. The method according to claim 1, wherein the first network device is connected to a network management device, and before obtaining, by the first network device, the first label information, the method further comprises:

receiving, by the first network device, indication information from the network management device, wherein the indication information triggers detection on an optical fiber connection of the first network device; and wherein obtaining, by the first network device, the first label information comprises:

generating, by the first network device, the first label information based on the indication information.

6. The method according to claim 5, wherein generating, by the first network device, the first label information based on the indication information comprises:
   detecting, by the first network device, whether the target optical output interface is occupied by an optical service signal; and
   generating, by the first network device, the first label information based on the indication information when the target optical output interface is not occupied by the optical service signal.

7. The method according to claim 1, wherein modulating, by the first network device, the first label information onto the optical signal, to generate the modulated optical signal comprises:
   changing, by the first network device, power intensity of the optical signal based on the first label information, to generate the modulated optical signal.

8. A method comprising:
   receiving, by a second network device from a target optical input interface, a modulated optical signal that is from a target optical output interface of a first network device, wherein the target optical input interface is one of at least one optical input interface of the second network device;
   obtaining, by the second network device, first label information from the modulated optical signal, wherein the first label information indicates the target optical output interface; and
   obtaining, by the second network device, second label information, wherein the second label information indicates the target optical input interface, and the first label information and the second label information are used to detect an optical fiber connection relationship between the target optical input interface and the target optical output interface.

9. The method according to claim 8, wherein the second network device is connected to a network management device, and the method further comprises:
   sending, by the second network device, the first label information and the second label information to the network management device.

10. The method according to claim 8, wherein the method further comprises:
    detecting, by the second network device, the optical fiber connection relationship between the target optical input interface and the target optical output interface based on the first label information and the second label information.

11. The method according to claim 10, wherein the method further comprises:
    sending, by the second network device, optical fiber connection indication information to the first network device, wherein the optical fiber connection indication information indicates the optical fiber connection relationship between the target optical input interface and the target optical output interface.

12. The method according to claim 10, wherein the second network device is connected to a network management device, and the method further comprises:
    sending, by the second network device, optical fiber connection indication information to the network management device, wherein the optical fiber connection indication information indicates the optical fiber connection relationship between the target optical input interface and the target optical output interface.

13. The method according to claim 8, wherein obtaining, by the second network device, the first label information from the modulated optical signal comprises:
    obtaining, by the second network device, the first label information based on a change of power intensity of the modulated optical signal.

14. A first network device, comprising a label loader, a laser, a demultiplexer, and at least one optical output interface that are sequentially coupled, wherein
    the label loader is configured to obtain first label information, wherein the first label information indicates a target optical output interface, and the target optical output interface is one of the at least one optical output interface;
    the laser is configured to generate an optical signal, wherein a wavelength of the optical signal is within a wavelength range corresponding to the target optical output interface, and the laser is further configured to modulate the first label information onto the optical signal, to generate a modulated optical signal; and
    the demultiplexer is configured to send the modulated optical signal from the target optical output interface to a target optical input interface of a second network device, to detect an optical fiber connection relationship between the target optical output interface and the target optical input interface.

15. The first network device according to claim 14, wherein:
    the label loader is further configured to obtain wavelength indication information, wherein the wavelength indication information indicates the wavelength range of the target optical output interface; and
    the laser is further configured to generate the optical signal based on the wavelength indication information.

16. The first network device according to claim 15, wherein the first label information comprises at least the wavelength indication information.

17. The first network device according to claim 14, wherein the first network device is connected to a network management device, and wherein:
    the label loader is further configured to receive the first label information from the network management device.

18. The first network device according to claim 14, wherein the first network device is connected to a network management device, and wherein:
    the label loader is further configured to receive indication information from the network management device, wherein the indication information triggers detection on an optical fiber connection of the first network device; and
    the label loader is further configured to generate the first label information based on the indication information.

19. The first network device according to claim 18, wherein:
    the label loader is further configured to detect whether the target optical output interface is occupied by an optical service signal; and
    the label loader is further configured to generate the first label information based on the indication information when the target optical output interface is not occupied by the optical service signal.

20. The first network device according to claim 14, wherein:

the laser is further configured to change power intensity of the optical signal based on the first label information, to generate the modulated optical signal.

\* \* \* \* \*